(12) United States Patent
Fujimoto et al.

(10) Patent No.: US 6,544,367 B1
(45) Date of Patent: Apr. 8, 2003

(54) OVERWRAP TAPE END-EFFECTOR FOR FIBER PLACEMENT/WINDING MACHINES

(75) Inventors: Kazutoshi Fujimoto, deceased, late of South Weber, UT (US), Muriel Fujimoto legal representative; Lloyd G. Miller, Bountiful, UT (US)

(73) Assignee: Alliant Techsystems Inc., Edina, MN (US)

( * ) Notice: Subject to any disclaimer, the term of this patent is extended or adjusted under 35 U.S.C. 154(b) by 0 days.

(21) Appl. No.: 09/241,830

(22) Filed: Feb. 1, 1999

(Under 37 CFR 1.47)

(51) Int. Cl.[7] .......................... B65H 81/00; B32B 31/00
(52) U.S. Cl. ...................... 156/187; 156/189; 156/425; 156/523; 156/574
(58) Field of Search .................. 156/425, 433, 156/441, 574, 523, 361, 378, 379, 64, 187, 189, 215

(56) References Cited

U.S. PATENT DOCUMENTS

| | | | |
|---|---|---|---|
| 4,461,669 A | * | 7/1984 | Dontscheff ............... 156/574 |
| 4,799,981 A | * | 1/1989 | Stone et al. ............... 156/64 |
| 4,872,619 A | | 10/1989 | Vaniglia |
| 4,877,193 A | | 10/1989 | Vaniglia |
| 4,882,007 A | | 11/1989 | Lengen et al. |
| 4,907,754 A | | 3/1990 | Vaniglia |
| 4,938,824 A | | 7/1990 | Youngkeit |
| 4,943,338 A | | 7/1990 | Wisbey |
| 4,981,545 A | | 1/1991 | Shinno et al. |
| 5,032,221 A | * | 7/1991 | Shinno et al. ............... 156/361 |
| 5,045,147 A | | 9/1991 | Benson et al. |
| 5,145,543 A | * | 9/1992 | Redd et al. ............... 156/171 |
| 5,290,389 A | | 3/1994 | Shupe et al. |
| 5,472,553 A | | 12/1995 | Roberts |
| 5,480,508 A | * | 1/1996 | Manabe et al. ............. 156/353 |
| 5,700,347 A | * | 12/1997 | McCowin ................. 156/425 |

FOREIGN PATENT DOCUMENTS

DE             29705258            7/1998

OTHER PUBLICATIONS

Copy of International Search Report dated Jul. 6, 2000.

* cited by examiner

Primary Examiner—Richard Crispino
Assistant Examiner—Sue A. Purvis
(74) Attorney, Agent, or Firm—TraskBritt (57) ABSTRACT

A tape delivery end-effector apparatus is, in an exemplary embodiment, a multiple-channel system for applying materials in tape form to a tooling mandrel. The end-effector apparatus is mounted on a multi-axis fiber placement machine and uses the machine's computer controlled guidance system. A preset constant tension is independently applied to each tape unspooled from spool holders by a separate servo motor, servo amplifier and feedback transducer for each spool holder. The transducer continuously measures the tape spool diameter. Two sets of rollers guide the tapes to the mandrel.

48 Claims, 5 Drawing Sheets

OVERWRAP TAPE END-EFFECTOR FOR FIBER PLACEMENT/WINDING MACHINES

BACKGROUND OF THE INVENTION

1. Field of the Invention

This invention relates generally to the fabrication of composite structures. More particularly, the invention pertains to apparatus for applying shrink wrap and/or other tape or tape-like materials to a composite structure formed on a tooling mandrel or the like.

2. State of the Art

Composite reinforced structures are typically useful where light weight and strength are required, and include such items as shrouds, casings, shafts, tanks, airfoils and fuselage panels in the aerospace technology. It is recognized that composite structures would be useful in many other applications, were it not for the relatively high cost. One item of significant expense in producing composite structures is found in the step of applying an overwrap release material to the uncured composite structure and/or the tooling. In the manufacture of composite structures by winding of fiber tows on a mandrel or other tool, a layer of release material may be first placed on the tooling, fiber placement/winding is performed, and the fiber-wound tool is cured to harden the component before removing it from the tooling. Use of an overwrap material which easily releases off component surfaces, or, if so used, the tool, permits ready consolidation of the uncured composite structure, or, if so used, easy separation of the component from the tool, following curing. A shrink-wrap overwrap material is used to facilitate the consolidation of the composite structure during the curing process by the shrink-wrap material exerting a force on the composite structure due to the heating and attendant shrinkage of the shrink-wrap material, typically the composite structure being cured in an autoclave. In the case of the tool, it is very important that none of the resin of the composite component touches the mandrel surface and adheres thereto because removal of the product from the mandrel is made difficult. Typically, shrink-wrap materials, such as a suitable shrink-wrap plastic material, or release materials such as paper or a non-adhering film of plastic, such as polyethylene, have been or are applied, in sheet form or other suitable forms, to the tool by hand. The shrink-wrap materials and release materials have also been produced and applied in the form of a tape.

In a typical process of overwrapping, an operator holds a spool of tape in a gloved hand and, with the other hand, guides the tape onto the composite structure or a rotating mandrel, letting it wrap itself around the composite structure or mandrel while attempting to manually maintain constant tape tension and tape advance.

Several deficiencies in this method are obvious. First, the operator must simultaneously control the continuously changing advancing placement of the tape on the composite structure or mandrel and continuously attempt to keep as constant tension as possible on the tape. Even if the mandrel is rotated at a slow speed, tape application will not be uniform in each instance, nor uniform from one composite structure or mandrel to the next. The manual application requires a high degree of mental concentration of the operator and a high degree of manual dexterity of the operator, and a brief lapse of either may require rework of an overwrap, which may be difficult. Even highly qualified personnel may produce defective overwrapping of composite structures, mandrels, or tools, leading to irregularities in the finished surface of the finished product. Such defects include irregular overlapping of layers, varying thicknesses, voids, etc. and are particularly prevalent in products of complex geometric shapes.

Each unit of composite structure product fabricated by fiber placement or winding process on a mandrel or other suitable tooling can have a shrink-wrap material applied thereover at the end of the placement or winding process to help consolidate the uncured fiber forming the composite structure during the curing thereof in an autoclave. Winding shrink-wrap material over the uncured composite structure is a relatively lengthy, time-consuming process. The length of time for the winding of the shrink-wrap material over the uncured composite structure increases with the geometric shape and size of the composite structure. Large and complex shaped geometric structures require greater winding time than small, simple geometric structures.

Similarly, each unit of composite product fabricated by fiber placement/winding on a mandrel requires an initial overwrapping of the tooling, e.g. mandrel, with a release material, prior to fiber placement/winding. The time for overwrapping is relatively lengthy, particularly for tooling of complex geometric shape.

A great deal of effort has been expended in the development of fiber placement/winding machines, as characterized in U.S. Pat. Nos. 4,872,619, 4,877,193, and 4,907,754 of Vaniglia, U.S. Pat. No. 4,943,338 of Wisbey, U.S. Pat. No. 5,045,147 of Benson et al., U.S. Pat. No. 5,290,389 of Shupe et al., and U.S. Pat. No. 5,472,553 of Roberts.

However, the wrapping of uncured composite structures and/or the overwrapping of tooling with shrink-wrap materials or release materials, respectively, has generally remained as a manual process, particularly for uncured composite structures and/or tooling for composite structures of complex geometric shape.

In U.S. Pat. No. 4,938,824 of Youngkeit, a method for forming and applying composite tape to a mandrel is described. The composite tape is formed by fiber winding on a mandrel covered with "a suitable backing film or paper (not shown) such as, for example, polyethylene, nylon, or another suitable plastic film on the mandrel . . ." There is no mention of how the backing material is placed on the mandrel. In this reference, the composite material on the mandrel is subsequently cut into strips for subsequent application in tape form to a product mandrel, and the backing material is retained on the backside of the composite tape during intermediate storage on reels.

There is a need in the art for an apparatus capable of automated placement of one or more tapes of overwrap material on tooling, such as a rotatable mandrel.

There is a need for such an apparatus which may be readily adapted to control by existing automated machines at a composite manufacturing site, thereby avoiding the high cost of additional computer manipulable, multi-axis machines, computer programming, and hand placement of wrapped materials. Particularly, there is a need for such an apparatus for the wrapping or winding of shrink-wrap materials over an uncured composite structure to replace the hand application thereof presently occurring.

Furthermore, installation of a separate machine for the wrapping of shrink-wrap material over an uncured composite structure or the overwrapping of a mandrel or other tooling will include a carriage of a size which may require a separate station for overwrapping. Thus, it would be necessary to physically transfer the uncured composite structure to another station where the machine is located for the wrapping of the shrink-wrap material after the wrapping of the shrink-wrap material or the transfer of the mandrel from an overwrap station to a fiber placement station after an overwrapping step, such use of a separate machine for such wrapping being undesirable from a process standpoint, a facilities standpoint, and a cost standpoint.

Therefore, it is very desirable to have an apparatus which may be attached to an existing multi-axis fiber placement/winding machine after the completion of the fiber placement/winding to form the uncured composite structure or prior to the formation of the uncured composited structure on a mandrel or other suitable tooling, the apparatus being used for the wrapping of shrink-wrap material over the uncured composite structure or the overwrapping of the mandrel or other suitable tooling before the formation of the uncured composite structure thereon.

BRIEF SUMMARY OF THE INVENTION

The invention comprises a multi-spool overwrap tape material end-effector apparatus which is attachable on multi-axis fiber placement machines. The end-effector apparatus is useful for placing shrink wrap material on uncured composite structures having a complex geometric shape of any size and other overwrap materials, such as release agents, for example, on mandrels or suitable tooling of complex geometry of any size, or the interior thereof. The end-effector apparatus is lightweight, i.e. may be manually lifted, and is readily attached to and detached from a multi-axis fiber placement/winding machine of the type disclosed in U.S. Pat. No. 4,867,834, i.e. a 6- or 7-axis, or any desired number axis, multi-axis fiber placement/winding machine.

In the end-effector apparatus of the invention, shrink-wrap materials, overwrapping tapes, and/or any other desired materials are dispensed from at least one spool, but preferably three or more spools, under tension to a guide roller or redirect roller and then to an application roller for application of the tape(s) to un uncured composite structure, a mandrel, or any other suitable tooling. Each channel of tape application is independently controlled with respect to unspooling tension, and the unspooling speed is dependent upon the mandrel shape and turning speed (RPM). Control of the fiber placement/winding machine permits delivery of the tape or tapes either upon the uncured composite structure, the mandrel surface, the surface of the other suitable tooling, or at a standoff distance from any of such. A sensor arm serves several purposes. First, the arm senses the diameter of the tape spool for controlling the tension placed on the unspooling tape. Second, the arm also prevents the tape from excessive unwinding, e.g., when the apparatus is inverted.

The end-effector apparatus of the invention provides a short, simple, direct, non-convoluted tape delivery path from each tape spool to the delivery roller, promoting reliable operation and precise control of tape placement onto the tooling, as well as facilitating precise termination and re-start of tape placement.

The end-effector apparatus of the invention provides for very consistent and controlled wrapping of uncured composite structures with shrink-wrap material or overwrapping of mandrels or other suitable tooling with a suitable release material. Composite structures which have consistently smoother, more even surfaces are produced using the end-effector apparatus of the present invention. Voids are generally eliminated and ply compactions and consolidations of the fiber materials are more consistent and repeatable than in hand-applied overwraps.

Processing time of the formation and curing of the composite structure is also reduced because of the automated operation of the end-effector apparatus and because of the simultaneous, multiple tape applications in a preferred embodiment of the apparatus.

BRIEF DESCRIPTION OF THE DRAWINGS

The invention is illustrated in the following exemplary figures.

The drawings of the end-effector apparatus of the present invention will be better understood when taken in conjunction with the description of the invention hereafter.

DESCRIPTION OF THE ILLUSTRATED EMBODIMENTS

Referring to drawing FIGS. 1 through 6, the structure and operation of a preferred embodiment of a multi-spool overwrap tape end-effector apparatus 10 of the present invention will be described.

Figure 1:
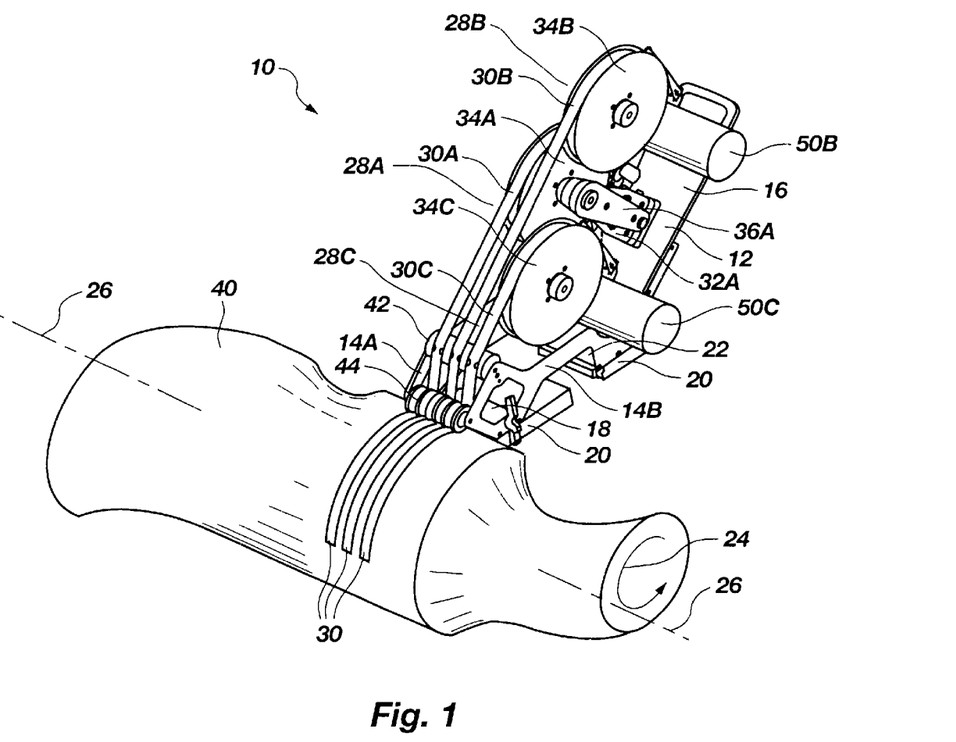
FIG. 1 is an isometric view of an overwrap tape end-effector apparatus of the invention attached to a multi-axis fiber placement/winding machine and applying three parallel tapes of a shrink-wrap material to an uncured composite structure having a complex geometric shape or overwrap material to a mandrel or other suitable tooling having a complex geometric shape.

As shown, the overwrap tape end-effector apparatus 10 of the invention has a frame 12 which is configured for attachment to a member of a multi-axis fiber placement machine 20 for delivering a wrapping material 30, such as a shrink wrap plastic film 30 or other desired material, as tapes 30A, 30B and 30C to an uncured composite structure 40, a tooling mandrel 40, or other suitable tooling 40, or the interior of other suitable tooling 40. Uncured composite structure 40, or mandrel 40, or other suitable tooling 40, or the interior thereof, is shown as being rotatable in direction 24 about its central axis 26, desired rotational axis 26, or any desired axis 26.

Figure 2:
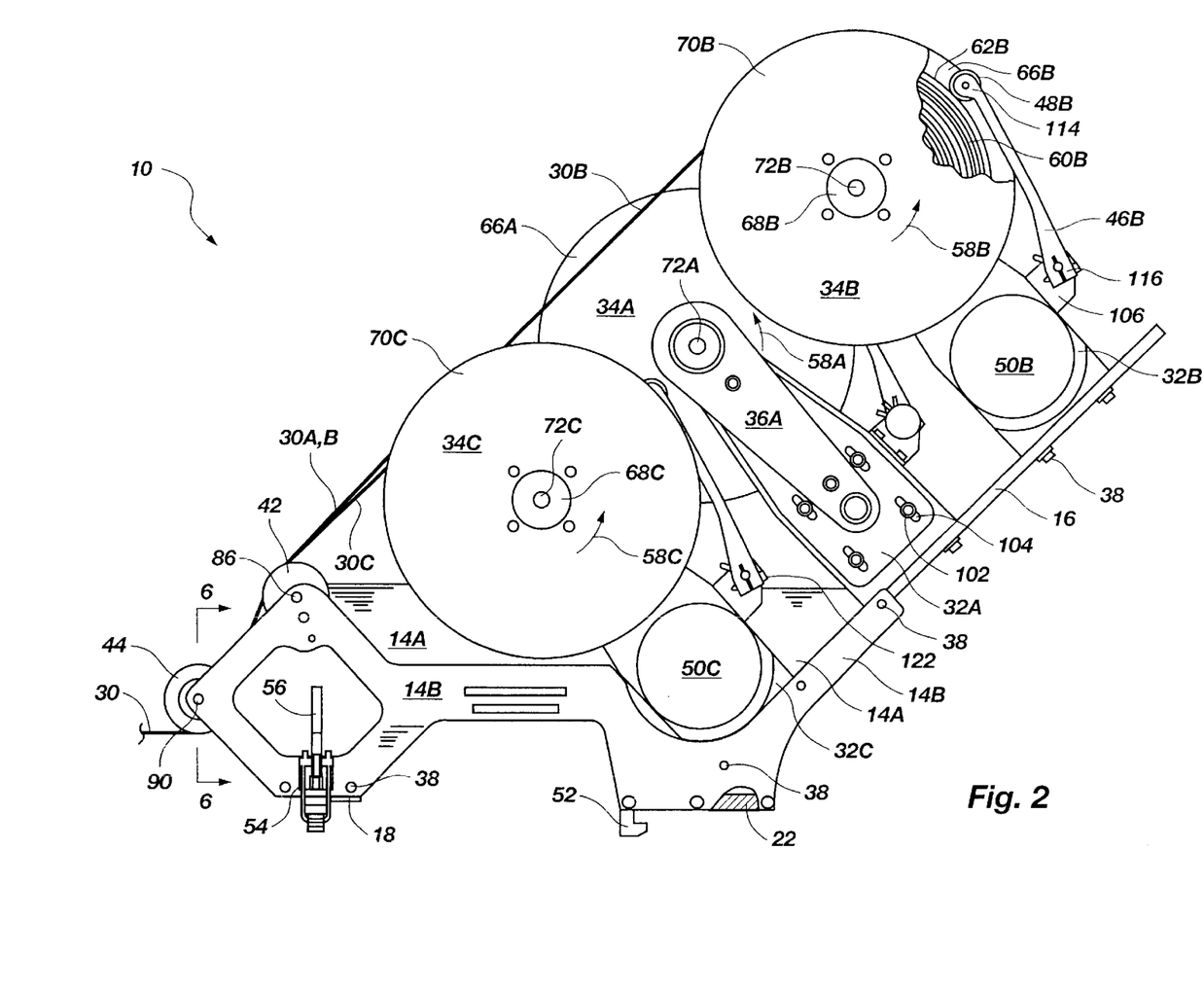
FIG. 2 is a side view of an overwrap tape end-effector apparatus of the invention.
Figure 3:
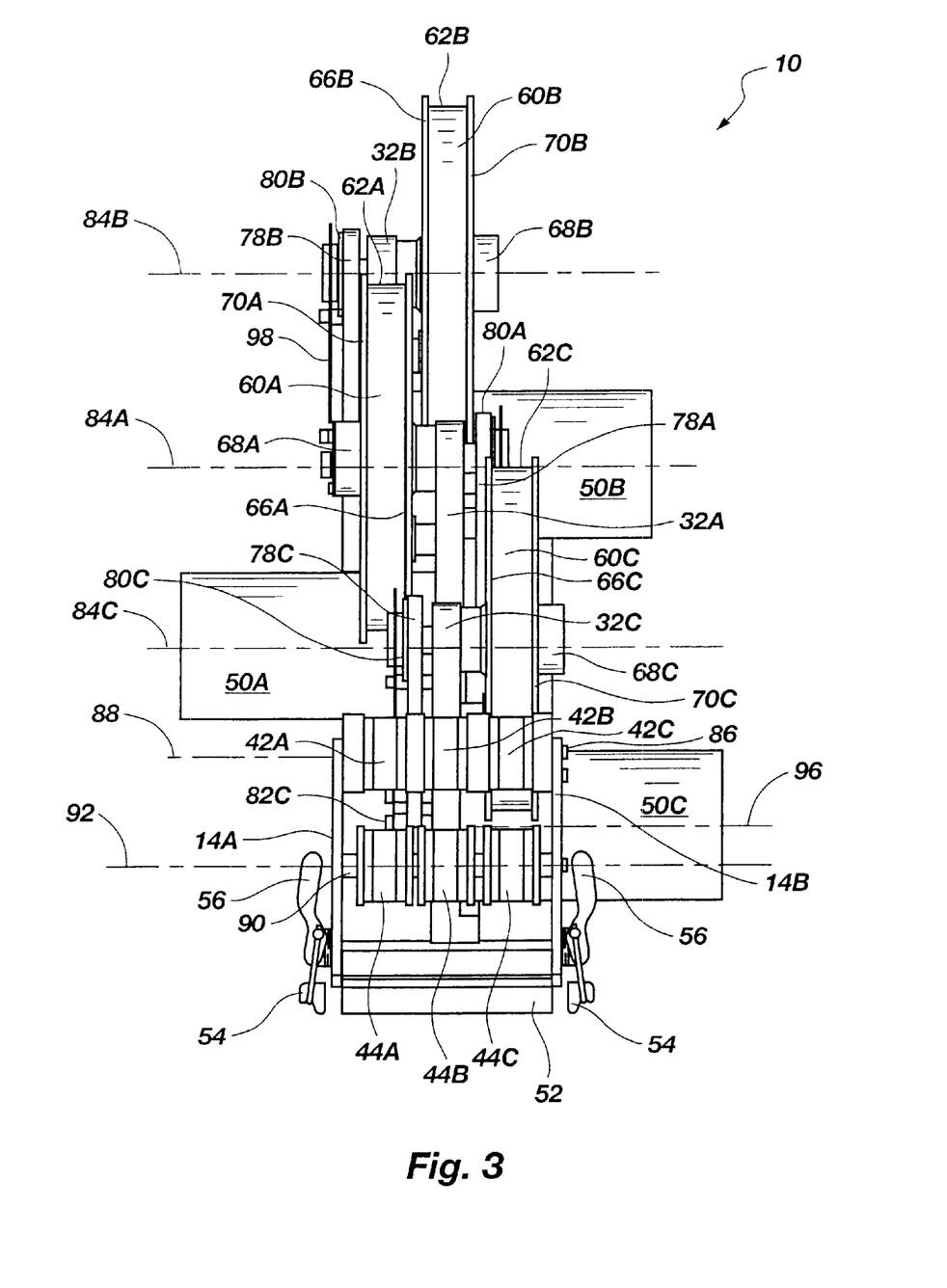
FIG. 3 is a frontal view of an overwrap tape end-effector apparatus of the invention, in which belt guards are partially deleted to expose the drive assemblies.

The frame 12 is shown in drawing FIGS. 1 through 3 as including parallel side plates 14A and 14B which are joined by backplate 16, cross plate 18 and base 22. The various plates 14A, 14B, 16, 18 and base 22 are connected by fasteners 38, typically screws. The frame 12 is shown with a latch plate 52 on base 22 and a quick-release clamp 54 with a handle 56 mounted on each side plate 14A, 14B. The frame 12 may be quickly attached and removed from a multi-axis fiber placement machine 20. The major non-motor components of end-effector apparatus 10 may be made of lightweight materials, e.g. aluminum, titanium, magnesium, a composite material structure, etc., enabling it to be manually lifted for installation and removal. In addition, portions of the planar portions, i,e., plates 14A, 14B, 16, 18 and base 22, as well as the flanges 66, 70 may be cut out to further lighten the end-effector apparatus.

Figure 4:
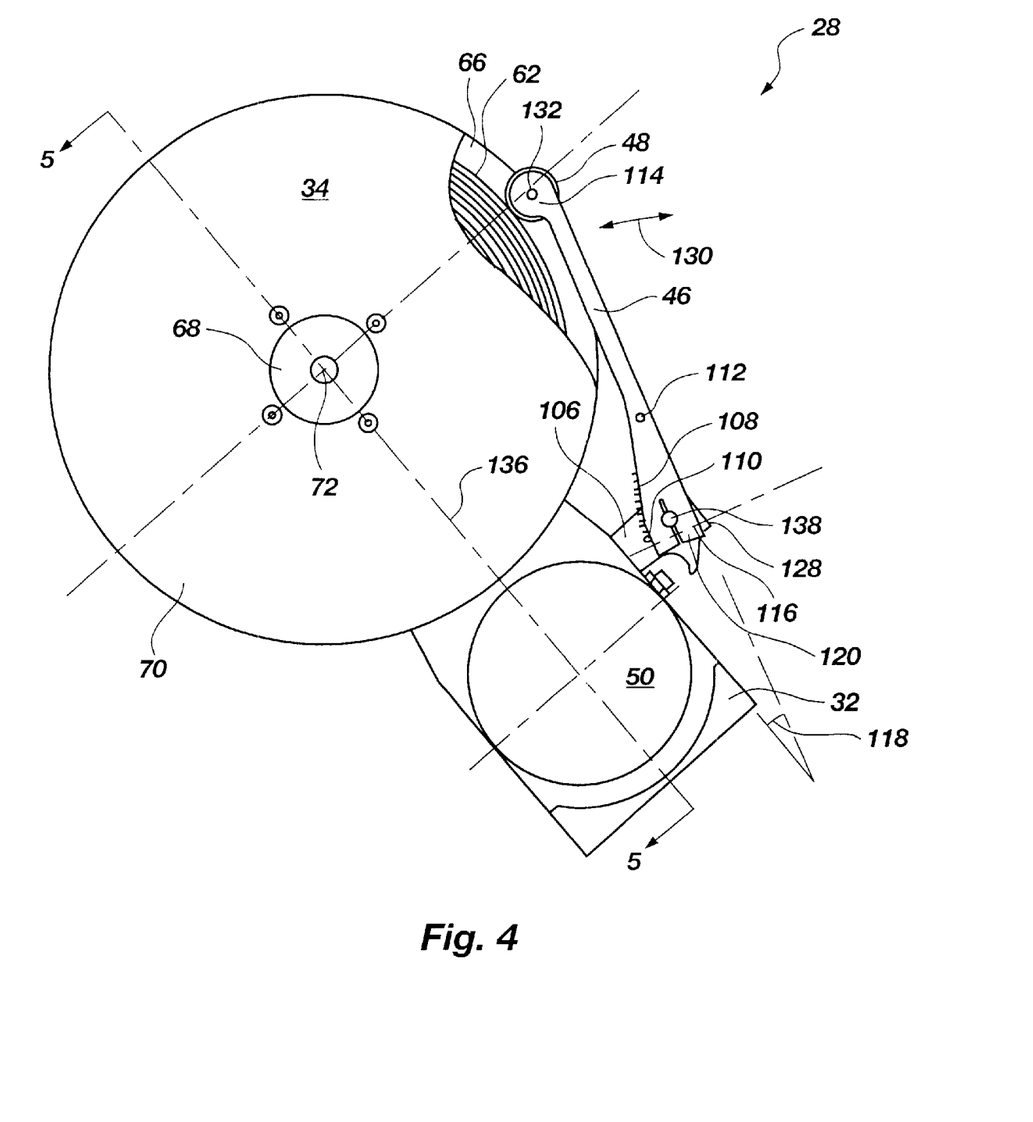
FIG. 4 is an enlarged side view of a spool holder drive of an overwrap tape end-effector apparatus of the invention.
Figure 5:
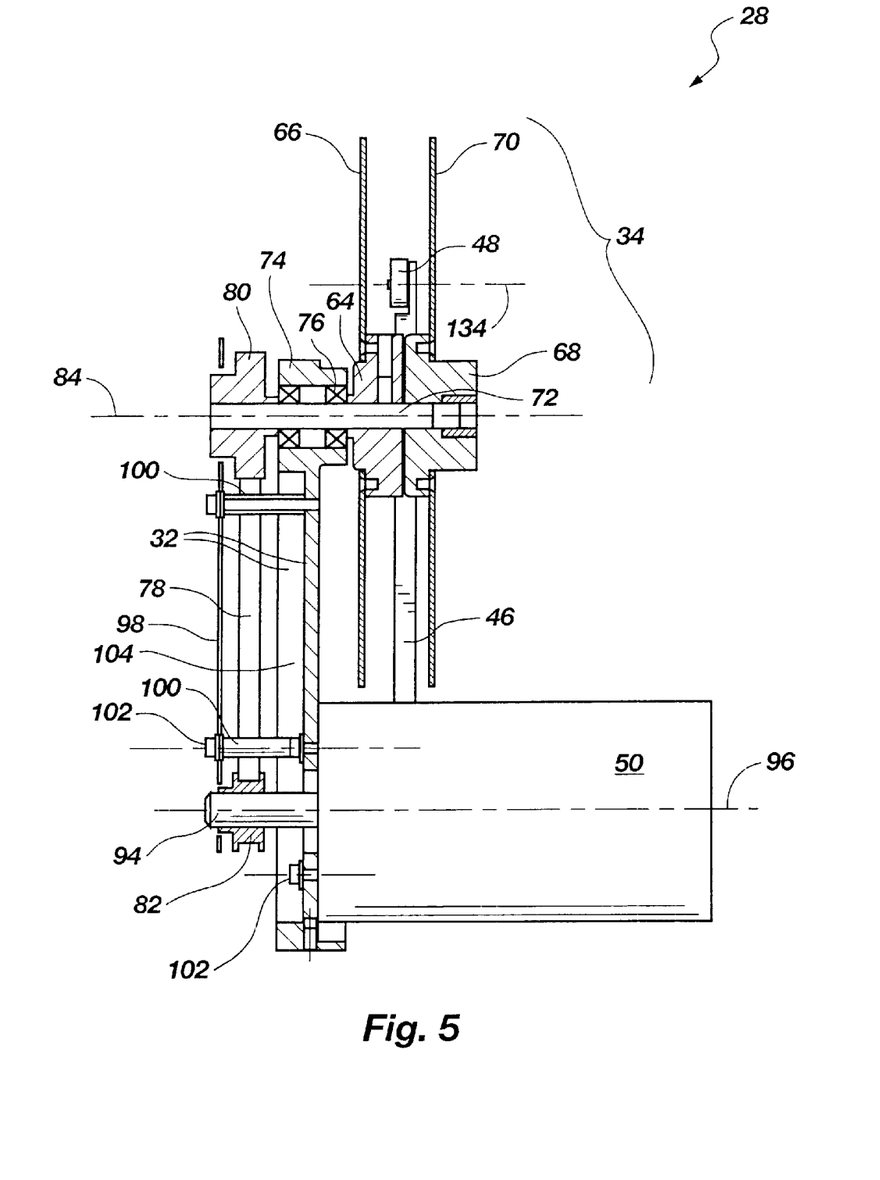
FIG. 5 is a cross-sectional bottom view of a spool holder drive of an overwrap tape end-effector apparatus of the invention, as taken along line 5—5 of FIG. 4 but without a tape spool.

At least one tape-feeding assembly 28, as depicted in drawing FIGS. 4 and 5, is mounted to the backplate 16 of frame 12. The embodiment of the end-effector apparatus 10 shown in drawing FIGS. 1 through 3 has three tape-feeding assemblies 28A, 28B, 28C for applying three tapes 30A, 30B, and 30C which are controllably spaced from each other.

The parts of each particular tape-feeding assembly 28A, 28B, and 28C will be identified herein by the corresponding suffix A, B, or C following the identification numeral. In particular, the numerals 28, 30, 32, 34, 36, 46, 48, 50, 58, 60, 62, 64, 66, 68, 70, 72, 74, 76, 78, 80, 82, 84, 94, 96, 98, 106, and 108, without the suffix A, B, or C, denoting the part in general.

As depicted in drawing FIGS. 2–5, the tape-feeding assembly 28 includes a stanchion bar 32 which is mounted on the backplate 16 for supporting a rotatable spool holder 34, a torque servo motor 50 and a belt drive assembly 36 between the motor and the spool holder. The stanchion bar 32 is shown with a center line 136. A spool 60 of overwrap tape is insertable in the spool holder 34 for unspooling under tension to a guide roller 42 (also known as a redirect roller) and then to an application roller 44 from which the tape is applied to the tooling mandrel 40. As configured, spool holder 34 comprises an inner hub 64 and an outer hub 68 which are together mounted on a rotatable spool holder shaft 72 passing through journal 74 on the stanchion bar 32. Preferably, journal 74 is fitted with bearings 76. The spool holder 34 rotates in direction 58 as the tape 30 is unspooled toward the tooling mandrel 40. The torque servo motor 50 applies movement to take up slack in the tape as the tape is being applied to the uncured composite structure or the mandrel or tooling, or drag to the unspooling of the tape, or resistance to rotation of the spool holder 34 through a toothed timing belt 78 rotating on a motor connected pulley 82 and a pulley 80 fixed to spool holder shaft 72. Each spool holder shaft 72 with attached pulley 80 and spool holder 34 rotates about an axis 84. In the instance where the distance between the end-effector apparatus 10 and the work surface of the uncured composite structure, mandrel, or other suitable tooling is large, the ability to control the slack in the tape 30 as it is being applied to the work surface through the use of the servo motor 50 is desirable.

Each guide roller 42A, 42B, and 42C is independently rotatable on shaft 86 about axis 88. Each application roller 44A, 44B and 44C is independently rotatable on shaft 90 about axis 92. In the embodiment shown in the drawing figures, axes 84A, 84B, 84C, 88 and 92 are parallel.

An inner flange 66 is affixed to the inner hub 64, which is affixed to the spool holder shaft 72. An outer flange 70 is affixed to outer hub 68. Outer hub 68 with attached outer flange 70 is configured to slidingly fit on shaft 72 for quick removal to permit installation of a spool 60 of tape, or removal thereof. Optionally, any type of quickly openable retaining device, not shown, may be used if desired to lock the outer hub 68 and flange 70 to the inner hub 64 and inner flange 66.

In each tape-feeding assembly 28, a sensor arm 46 with a sensor roller 48 at an outer end 114 thereof is pivotably mounted on a sensor bracket 106 extending from the stanchion bar 32 for simultaneously sensing the diameter of the circumferential surface 62 of the spool 60 of tape in the spool holder 34, and inwardly compressing the tape on spool 60 to prevent inadvertent unwinding. The sensor roller 48 is shown as having a shaft 132 rotatable about axis 134. The sensor arm 46 is biased by a spring, shown here as a coil spring 108, extending between pin 110 and pin 112.

A transducer 120 sensitive to rotational position is mounted at the sensor arm 46-bracket 106 interface to exert an electrical potential as a function of rotational angle 118. The transducer 120 may, for example, comprise a variable resistance potentiometer type instrument. A first portion 122 of the potentiometer 120 is firmly held in a slot 126 in the sensor arm 46 by a tightening screw 128. Another portion, not visible, is held by the bracket 106, so that rotation of the sensor arm 46 in direction 130 changes the resistance and thus the potential of a current passed through the potentiometer 120. The potential signal from the transducer 120 is routed to a control unit (not shown) which, in turn, controls the servo motor 50, thereby controlling the tension in the tape by controlling the motor output. By way of example, a typical potentiometer 120 useful for this purpose is an Allen-Bradley Type J of 50 K ohms maximum resistance. Any instrument which generates an electrical potential relative to an angular position may be used, however.

As shown in drawing FIGS. 3 and 5, each tape feeding assembly 28A, 28B and 28C is driven by a corresponding servo motor 50A, 50B, 50C with rotating shaft 94. The toothed belt 78 transmitting tension force from the motor 50 through pulleys 82 and 80 to the spool holder 34 has a protective shield 98 held in place by standoffs 100 from the stanchion bar 32. The DC servo motor 50 is shown mounted on the stanchion bar 32 with screws 102 passing through slots 104 in the stanchion bar 32 for belt adjustment.

Figure 6:
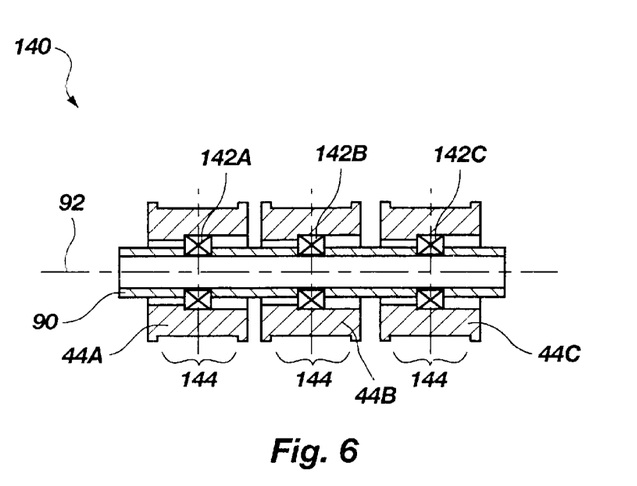
FIG. 6 is a cross-sectional longitudinal view of a final roller assembly of an overwrap tape end-effector apparatus of the invention, as taken along line 6—6 of FIG. 5.

Turning now to drawing FIG. 6, a detailed view of an application roller assembly 140 is pictured. Three application rollers 44A, 44B and 44C are spacedly mounted on roller shaft 90 with bearings 142A, 142B, 142C, respectively, to be independently rotatable about axis 92. Like the guide rollers 42A, 42B and 42C, the application rollers 44A, 44B and 44C are free-wheeling, i.e. freely rotatable. The application rollers 44 are mounted on the shaft 90 to accommodate a given tape width 144 and provide a desired spacing. Adjustments in tape spacing may be made without making changes to the axial spacing of the spool holders 34A, 34B and 34C.

By varying the placement of clamps 54 and/or other connecting devices, the end-effector apparatus 10 may be easily adapted for mounting on and use with a wide variety of fiber placement machines 20. For example, the embodiment shown in the drawing figures herein is mountable on a multi-axis fiber placement machine 20 of the type shown in U.S. Pat. No. 4,867,834. In this example, a fiber winding assembly used as part of the multi-axis fiber placement machine 20 may be simply loosened, turned 90 degrees and the end-effector 10 attached to the machine. The transformation from a fiber winding machine to a wrapping device may be accomplished easily and quickly. The continuous changes in orientation required for accurate placement of the overwrap material are programmable in the existing computer of the fiber placement machine 20. Preferably, a fiber placement/winding machine 20 capable of motion typically in at least 6 degrees of freedom, although a machine having any desired number of degrees of freedom may be used, is combined with the tape winding end-effector apparatus 10 described herein.

The overwrap end-effector as described herein increases the tape laydown rate and provides a desired spacing between tapes where the spacing may be programmed to be constant or varying over the mandrel surface. Because of the computer control, the program may be readily changed at will to avoid defects and provide products of high quality and repeatability. The consistent tape tension and computer controlled laydown pattern result in uniformity and manufacturing repeatability of the composite structure product.

The present invention has been described in terms of an illustrated, preferred embodiment. Additional modifications will readily be recognized by those of ordinary skill in the art. Therefore, the invention in its broader aspects is not limited to the specific details, and representative device, shown and described herein. Accordingly, various modifications including additions and deletions may be made without departing from the spirit and scope of the general inventive concept and embodiments as defined by the appended claims and their equivalents.

What is claimed is:

1. An apparatus for applying a tape to a work surface, comprising:
    a frame removably securable to a support structure for supporting the apparatus;
    a tape feeding assembly fixed to said frame, said tape feeding assembly comprising:
        a stanchion bar attached to said frame;
        a plurality of spool holders rotatably attached to said stanchion bar, each spool holder of said plurality of spool holders for holding a spool of tape for dispensing said tape;
        a guide roller assembly having at least a first rotatable guide roller for guiding a tape from a spool of said plurality of spool holders, said guide roller assembly fixed to said frame;
        an application roller assembly having a plurality of independently rotatable rollers, said application roller assembly including at least a first rotatable application roller for accepting said tape from said first guide roller and applying said tape to said work surface, said application roller assembly fixed to said frame; and
        apparatus for controlling said tape while applying said tape to said work surface.

2. The apparatus of claim 1, further comprising a spool mounted on said plurality of spool holders, said spool for holding and dispensing a tape, said tape wound on said spool and having an outer peripheral surface.

3. The apparatus of claim 2, wherein a tension apparatus for maintaining a constant tension on said tape comprises:
    a servo motor, measuring apparatus for continuously measuring a diameter of spooled tape on said spool, a servo amplifier and feedback apparatus used for controlling said servo motor based on the spooled tape diameter to control said tape during unspooling thereof.

4. The apparatus of claim 3, wherein said measuring apparatus for continuously measuring the diameter of the spooled tape comprises:
    a sensor arm swivelable about an axis at a first end thereof and having a sensor roller at an opposite end thereof, said sensor roller biased to ride on an outer periphery of said spooled tape; and
    a feedback transducer configured to provide an electrical signal as a function of an angular position of said sensor arm and transmitting said electrical signal to said servo amplifier.

5. The apparatus of claim 4, wherein said sensor roller is biased to ride on said spooled tape by a resilient member, the resilient member including a spring.

6. The apparatus of claim 3, wherein said computer is programmable to continuously control the servo motor to control the dispensing of said tape at a controllable distance from said work surface.

7. The apparatus of claim 1, wherein said support structure comprises:
    a continuously attitude-controllable component of a multi-axis machine by which an attitude of said apparatus for applying said tape to said work surface is controlled.

8. The apparatus of claim 7, further comprising a computer for controlling the attitude of said apparatus for applying said tape to said work surface.

9. The apparatus of claim 1, wherein said apparatus for controlling said tape is programmable.

10. The apparatus of claim 1, wherein said apparatus for controlling said tape is programmable to provide a variable control of said tape.

11. The apparatus of claim 1, wherein said tape comprises a polymeric shrink-wrap film which conformably shrinks to a shape of the work surface when heated.

12. The apparatus of claim 1, wherein said tape comprises a release layer for separating a composite structure from the work surface.

13. The apparatus of claim 1, further comprising:
    clamp apparatus for detachably attaching said apparatus to a fiber machine having a computer connection for continuous attitude control thereof.

14. The apparatus of claim 13, wherein said computer is programmable to continuously control an attitude of the application roller assembly of said apparatus for applying said tape on the work surface.

15. The apparatus of claim 13, wherein said computer is programmable to continuously control an attitude of the application roller assembly of said apparatus to dispense said tape at a controllable distance from said work surface.

16. The apparatus of claim 1, wherein said work surface comprises an exterior surface of an uncured composite structure.

17. The apparatus of claim 1, wherein said work surface comprises an exterior surface of a rotatable mandrel for forming a composite structure.

18. The apparatus of claim 1, wherein said work surface comprises an exterior surface of rotatable tooling for forming a composite structure.

19. An apparatus for applying a plurality of laterally spaced tapes to a work surface, comprising:
    a multi-axis fiber machine having a computer for controlling an attitude of a head mount thereon;
    an overwrap tape end-effector apparatus attached to said head mount for attitude control by said computer, said overwrap tape end-effector apparatus comprising:
        a frame attached to said head mount;
        a plurality of tape feeding assemblies attached to said frame, each tape feeding assembly of said plurality of tape feeding assemblies configured for independent control of tension and speed of tape, said each tape feeding assembly of said plurality of tape feeding assemblies comprising:
            a rotatable spool holder for holding a spool of overwrap tape;
            a servo motor for applying tension to said rotatable spool holder as said overwrap tape is dispensed therefrom;
            control apparatus for determining a diameter of said rotatable spool of overwrap tape and controlling said servo motor as a function thereof; and roller apparatus for redirecting and applying said dispensed overwrap tape to said work surface, said roller apparatus comprising at least one rotatable redirect roller and a plurality of independently rotatable application rollers.

20. The apparatus of claim 19, wherein said multi-axis fiber machine is configured for said attitude control of the head mount.

21. The apparatus of claim 19, wherein said plurality of tape feeding assemblies comprises at least two or more tape feeding assemblies.

22. The apparatus of claim 19, wherein the control apparatus for determining the rotatable spool diameter comprises:
a sensor arm having a first end with a pivot axis and a rotation dependent transducer, and a second end having a sensor roller rotatable on a circumferential surface of said rotatable spool of overwrap tape, whereby a potential signal dependent on roller position is generated by said rotation dependent transducer for control of said tension applied by said servo motor.

23. The apparatus of claim 22, wherein said sensor roller is spring mounted for compression against said circumferential surface.

24. The apparatus of claim 19, wherein said work surface comprises an uncured composite structure.

25. The apparatus of claim 19, wherein said work surface comprises a rotatable mandrel.

26. The apparatus of claim 19, wherein said work surface comprises rotatable tooling.

27. The apparatus of claim 19, wherein said tension is controllable by said servo motor to be constant.

28. The apparatus of claim 19, wherein said tension is controllable by said servo motor to follow a variable pattern of an amount of tension.

29. An apparatus for applying a plurality of laterally spaced tapes to a work surface, comprising:
a multi-axis fiber machine having a computer for controlling an attitude of a head mount thereon;
an overwrap tape end-effector apparatus mountable on said head mount for attitude control by said computer, said overwrap tape end-effector apparatus comprising:
a frame mountable on said head mount;
a plurality of tape feeding assemblies attached to said frame, each tape feeding assembly of said plurality of tape feeding assemblies configured for independent control of tension and speed of tape, said each tape feeding assembly of said plurality of tape feeding assemblies comprising:
a rotatable spool holder for holding a spool of overwrap tape;
a servo motor for applying tension to said rotatable spool holder as said overwrap tape is dispensed therefrom;
control apparatus for determining a diameter of said rotatable spool of overwrap tape and controlling said servo motor as a function thereof; and
roller apparatus for redirecting and applying said dispensed overwrap tape to said work surface, wherein said roller apparatus comprises a plurality of independently rotatable redirect rollers and a plurality of independently rotatable application rollers.

30. An apparatus for applying a plurality of laterally spaced tapes to a work surface, comprising:
a multi-axis fiber machine having a computer for controlling an attitude of a head mount thereon;
an overwrap tape end-effector apparatus mountable on said head mount for attitude control by said computer, said overwrap tape end-effector apparatus comprising:
a frame mountable on said head mount;
a plurality of tape feeding assemblies attached to said frame, each tape feeding assembly of said plurality of tape feeding assemblies configured for independent control of tension and speed of tape, said each tape feeding assembly of said plurality of tape feeding assemblies comprising:
a rotatable spool holder for holding a spool of overwrap tape;
a servo motor for applying tension to said rotatable spool holder as said overwrap tape is dispensed therefrom;
control apparatus for determining a diameter of said rotatable spool of overwrap tape and controlling said servo motor as a function thereof; and
roller apparatus for redirecting and applying said dispensed overwrap tape to said work surface, wherein said roller apparatus comprises a plurality of independently rotatable redirect rollers and a plurality of independently rotatable application rollers, wherein said plurality of independently rotatable application rollers is mounted on a common shaft to rotate coaxially.

31. An apparatus for applying a plurality of laterally spaced tapes to a work surface, comprising:
a multi-axis fiber machine having a computer for controlling an attitude of a head mount thereon;
an overwrap tape end-effector apparatus mountable on said head mount for attitude control by said computer, said overwrap tape end-effector apparatus comprising:
a frame mountable on said head mount;
a plurality of tape feeding assemblies attached to said frame, each tape feeding assembly of said plurality of tape feeding assemblies configured for independent control of tension and speed of tape, said each tape feeding assembly of said plurality of tape feeding assemblies comprising:
a rotatable spool holder for holding a spool of overwrap tape;
a servo motor for applying tension to said rotatable spool holder as overwrap tape is dispensed therefrom;
control apparatus for determining a diameter of said rotatable spool of overwrap tape and controlling said servo motor as a function thereof; and
roller apparatus for redirecting and applying said dispensed overwrap tape to said work surface, wherein lateral spacing of said plurality of laterally spaced tapes is preset to provide for overlapping a portion of at least one tape of said plurality of laterally spaced tapes applied to said work surface.

32. A method for applying tape to a work surface, comprising:
providing an apparatus for dispensing tape to a work surface, wherein said apparatus for dispensing said tape comprises:
a guide roller assembly including at least a first rotatable guide roller for guiding said tape from a spool, said guide roller assembly fixed to a frame and
an application roller assembly having a plurality of independently rotatable application rollers including at least a first rotatable application roller for accepting said tape from said first rotatable guide roller and applying said tape to said work surface, said application roller assembly attached to said frame;

providing a multi-axis fiber placement machine having an arm having a support structure thereon;

mounting said apparatus on the arm of said multi-axis fiber placement machine;

mounting said spool of tape on a tape feeding assembly;

dispensing said tape from said apparatus to said work surface; and controlling tension of said tape while applying said tape to said work surface.

33. The method of claim 32, wherein said apparatus for dispensing said tape further comprises:

a frame removably securable to a support structure for supporting the apparatus;

a tape feeding assembly fixed to said frame, said tape feeding assembly comprising:

a stanchion bar attached to said frame;

a spool holder rotatably attached to said stanchion bar for holding a spool of tape for dispensing said tape;

tension apparatus for controlling the tension of said tape while applying said tape to said work surface; and a spool mounted on said spool holder for holding and dispensing a tape of overwrap material, said tape of overwrap material wound on said spool and having an outer peripheral surface.

34. The method of claim 33, wherein said tension apparatus for controlling the tension on said tape comprises:

a servo motor, measuring apparatus for continuously measuring a diameter of spooled tape on said spool, a servo amplifier and feedback apparatus for controlling said servo motor based on the spooled tape diameter to provide a preset tension on said spooled tape during unspooling thereof.

35. The method of claim 34, wherein said measuring apparatus for continuously measuring the diameter of spooled tape comprises:

a sensor arm swivelable about an axis at a first end thereof and having a sensor roller at an opposite end thereof, said sensor roller biased to ride on an outer periphery of said spooled tape; and a feedback transducer configured to provide an electrical signal as a function of an angular position of said sensor arm and transmitting said electrical signal to said servo amplifier.

36. The method of claim 35, further comprising:

biasing said sensor roller to ride on a portion of said spooled tape, said sensor roller biased to ride on said spooled tape by a resilient member.

37. The method of claim 33, further comprising:

programming said tension apparatus to provide a constant tension, said tension apparatus for controlling the tension including a tension apparatus programmable to provide said constant tension.

38. The method of claim 33, further comprising:

continuously controlling attitude of the application roller assembly of said apparatus including use of a computer for control of the attitude of the application roller assembly, said computer including a programmable computer to continuously control the attitude of the application roller assembly of said apparatus for applying said tape to the work surface.

39. The method of claim 32, further comprising:

controlling said apparatus, said support structure comprises a continuously attitude-controllable component of said multi-axis fiber placement machine by which an attitude of said apparatus is controlled.

40. The method of claim 39, wherein said multi-axis fiber placement machine includes a computer.

41. The method of claim 32, further comprising:

controlling said apparatus, wherein said support structure comprises a continuously attitude-controllable component of said multi-axis fiber placement machine by which an attitude of said apparatus is controlled.

42. The method of claim 41, wherein said multi-axis fiber placement machine includes a computer.

43. The method of claim 32, further comprising:

programming said tension apparatus to provide a variable tension, said tension apparatus for controlling the tension including a tension apparatus programmable to provide said variable tension.

44. The method of claim 32, wherein said tape comprises:

a release layer for separating a composite structure from a work surface.

45. The method of claim 32, wherein said tape comprises:

a polymeric shrink-wrap film which conformably shrinks to a shape of the work surface when heated.

46. The method of claim 32, further comprising:

providing clamp assemblies for detachably attaching said apparatus to a fiber placement machine having a computer for continuous attitude control thereof; and releasing said apparatus from said fiber placement machine.

47. The method of claim 46, further comprising:

controlling distance of said application roller assembly of said apparatus from said work surface, said computer including a programmable computer to continuously control the distance of the application roller assembly of said apparatus to dispense said tape at a controllable distance from said work surface.

48. The method of claim 32, wherein said work surface comprises an exterior surface of a rotatable mandrel for forming a composite structure.

* * * * *

UNITED STATES PATENT AND TRADEMARK OFFICE
CERTIFICATE OF CORRECTION

PATENT NO.    : 6,544,367 B1                                         Page 1 of 1
DATED         : April 8, 2003
INVENTOR(S)   : Kazutoshi Fujimoto and Lloyd G. Miller It is certified that error appears in the above-identified patent and that said Letters Patent is hereby corrected as shown below:

<u>Column 3,</u>
Line 38, change "un" to -- an --

<u>Column 6,</u>
Line 10, change "126" to -- 116 --

Signed and Sealed this

Twenty-sixth Day of August, 2003

JAMES E. ROGAN
*Director of the United States Patent and Trademark Office*